(12) United States Patent
Nonoyama et al.

(10) Patent No.: US 11,283,087 B2
(45) Date of Patent: Mar. 22, 2022

(54) FUEL CELL

(71) Applicant: TOYOTA JIDOSHA KABUSHIKI KAISHA, Toyota (JP)

(72) Inventors: Nobuaki Nonoyama, Chiryu (JP); Norishige Konno, Toyota (JP); Masayuki Ito, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 158 days.

(21) Appl. No.: 16/364,850

(22) Filed: Mar. 26, 2019

(65) Prior Publication Data
US 2019/0305325 A1 Oct. 3, 2019

(30) Foreign Application Priority Data

Mar. 28, 2018 (JP) .............................. JP2018-063276
Aug. 22, 2018 (JP) .............................. JP2018-155648

(51) Int. Cl.
| | |
|---|---|
| *H01M 8/026* | (2016.01) |
| *H01M 8/0254* | (2016.01) |
| *H01M 8/1004* | (2016.01) |
| *H01M 8/0263* | (2016.01) |
| *H01M 8/10* | (2016.01) |
| *H01M 8/0206* | (2016.01) |

(52) U.S. Cl.
CPC ......... *H01M 8/026* (2013.01); *H01M 8/0263* (2013.01); *H01M 8/1004* (2013.01); *H01M 8/0206* (2013.01); *H01M 8/0254* (2013.01); *H01M 2008/1095* (2013.01)

(58) Field of Classification Search
CPC .. H01M 8/026; H01M 8/0263; H01M 8/1004; H01M 8/0206; H01M 8/0254; H01M 2008/1095
See application file for complete search history.

(56) References Cited

U.S. PATENT DOCUMENTS

| | | |
|---|---|---|
| 2004/0028985 A1 | 2/2004 | Blank et al. |
| 2004/0209150 A1 | 10/2004 | Rock et al. |
| 2009/0004535 A1 | 1/2009 | Sugita et al. |
| 2011/0274999 A1 | 11/2011 | Mohri et al. |

(Continued)

FOREIGN PATENT DOCUMENTS

| | | |
|---|---|---|
| CN | 1788376 A | 6/2006 |
| JP | 2006-147466 | 6/2006 |

(Continued)

OTHER PUBLICATIONS

EPO machine generated English translation of JP-2007-005126-A (Year: 2007).*
Definition of "Plurality" (Dictionary.com). (Year: 2016).*

*Primary Examiner* — Christopher P Domone
*Assistant Examiner* — Kimberly Wyluda
(74) *Attorney, Agent, or Firm* — Finnegan, Henderson, Farabow, Garrett & Dunner, LLP

(57) ABSTRACT

A fuel cell includes: an electrolyte membrane; first and second catalyst layers respectively formed on first and second surfaces of the electrolyte membrane; and a separator, the first catalyst layer being arranged between the separator and the electrolyte membrane, wherein the separator includes first and second grooves through which reactant gas flows between the first catalyst layer and the separator.

11 Claims, 9 Drawing Sheets

(56) References Cited

U.S. PATENT DOCUMENTS

| | | | |
|---|---|---|---|
| 2012/0258380 A1 | 10/2012 | Takeguchi et al. | |
| 2013/0337359 A1 | 12/2013 | Sugiura et al. | |
| 2015/0132680 A1* | 5/2015 | Asano | H01M 8/0267 |
| | | | 429/482 |
| 2015/0200414 A1 | 7/2015 | Nagumo et al. | |
| 2018/0145352 A1 | 5/2018 | Kondo et al. | |

FOREIGN PATENT DOCUMENTS

| | | | |
|---|---|---|---|
| JP | 2006-523916 A | | 10/2006 |
| JP | 2007005126 A | * | 1/2007 |
| JP | 2007-141553 | | 6/2007 |
| JP | 2008-300096 A | | 12/2008 |
| JP | 2009-009837 | | 1/2009 |
| JP | 2014-026960 | | 2/2014 |
| JP | 2015-111558 | | 6/2015 |
| JP | 2015-133215 A | | 7/2015 |
| JP | 2018-085207 A | | 5/2018 |
| WO | WO 2010/082589 | | 7/2010 |

\* cited by examiner

FUEL CELL

CROSS-REFERENCE TO RELATED APPLICATION

This application is based upon and claims the benefit of priority of the prior Japanese Patent Application No. 2018-155648, filed on Aug. 22, 2018, and Japanese Patent Application No. 2018-063276, filed on Mar. 28, 2018, the entire contents of which are incorporated herein by reference.

FIELD OF THE INVENTION

The present disclosure relates to a fuel cell.

BACKGROUND

A separator of a fuel cell is formed with grooves through which reactant gas flows between the separator and a catalyst layer formed on an electrolyte membrane. The reactant gas flowing through the grooves is partially supplied to the catalyst layer to generate a power generation reaction. For example, grooves of the separator include wavy portions wavily extending, in Japanese Unexamined Patent Application Publication No. 2006-147466.

In order to guide the reactant gas from the wavy portions in the different direction within the plane of the separator, it is conceivable to provide a linear portion linearly extending in the different direction from the wavy portion in each groove. In a case where such grooves are provided, depending on a connection point between the linear portion and the wavy portion, an angle between a tangential direction of the wavy portion at the connection point and the linear portion might differ for each of the grooves. Also, the pressure loss of the reactant gas might differ for each of the grooves. Such a difference in pressure loss between the grooves might increase the flow rate of the reactant gas in one of the groove and might decrease the flow rate of the reactant gas in the other groove. Thus, the reactant gas might be hardly supplied to a part of the catalyst layer, so that the power generation performance might be deteriorated.

SUMMARY OF THE INVENTION

It is an object of the present disclosure to provide a fuel cell that suppresses deterioration of power generation performance.

The above object is achieved by a fuel cell including: an electrolyte membrane; first and second catalyst layers respectively formed on first and second surfaces of the electrolyte membrane; and a separator, the first catalyst layer being arranged between the separator and the electrolyte membrane, wherein the separator includes first and second grooves through which reactant gas flows between the first catalyst layer and the separator, each of the first and second grooves includes: a wavy portion wavily extending in a first direction; a linear portion linearly extending in a second direction intersecting the first direction, and located away from the wavy portion in the first direction; and a connecting portion connecting the wavy portion and the linear portion, the connecting portions of the first and second grooves respectively include first and second parts, and the first and second parts linearly extend from the wavy portion to the linear portion in respective directions that are substantially identical to the first direction or are between the first and second directions.

The linear portions of the first and second grooves linearly extend in the same second direction, and the first and second parts linearly extend from the wavy portion to the linear portion in respective directions that are substantially identical to the first direction or are between the first and second directions. Therefore, in the first and second grooves, the angular difference between the wavy portion and the connecting portion at the connecting point therebetween is small, and the angular difference between the first part and the linear portion and the second part and the linear portion is small. This suppresses an increase in the difference in pressure loss of the reactant gas between the first and second grooves, which suppresses the reactant gas from being hardly supplied to a part of the first catalyst layer. Thus, the deterioration of the power generation performance is suppressed.

An angle between the first part and the wavy portion of the first groove, at a connection point between the connecting portion of the first groove and the wavy portion of the first groove, may be identical to an angle between the second part and the wavy portion of the second groove, at a connection point between the connecting portion of the second groove and the wavy portion of the second groove.

The connecting portion of the first groove may extend in a tangential direction of the wavy portion of the first groove at a connection point between the connecting portion of the first groove and the wavy portion of the first groove.

Each length of the connecting portions of the first and second grooves in the first direction may be equal to or smaller than each wavelength of the wavy portions of the first and second grooves.

The second groove may be adjacent to the first groove, the separator may include a third groove adjacent to the first groove, the first groove may be arranged between the third and second grooves, the third groove may include a wavy portion wavily extending in the first direction, the wavy portion of the third groove, the wavy portion of the first groove, and the connecting portion of the second groove may be arranged in a direction orthogonal to the first direction, and amplitude of the wavy portion of the first groove may be smaller than that of the wavy portion of the third groove.

The linear portion of the first groove and the linear portion of the second groove may be commonly used.

The first catalyst layer may include an edge extending along the first direction, and the part of the connecting portion of the first groove may extend along the edge.

The first catalyst layer may include: a first edge extending along the first direction; and a second edge extending continuously from the first edge in a direction different from a direction in which the first edge extends, the connecting portion of the first groove may be located between the first edge of the first catalyst layer and the connecting portion of the second groove, the linear portion of the first groove may be located between the second edge of the first catalyst layer and the linear portion of the second groove, and a connection point between the linear portion of the first groove and the connecting portion of the first groove may be close to the second edge, as compare with a connection point between the linear portion of the second groove and the connecting portion of the second groove.

The separator may include first and second manifold holes through which the reactant gas flows, the connecting portions of the first and second grooves may be close to the first manifold hole, as compared with the second manifold hole, and the connecting portions of the first and second grooves may be located outside a region that is formed by projecting the first manifold hole toward the second manifold hole in a direction parallel to the first direction.

The fuel cell may include another separator different from the separator, the second catalyst layer may be arranged between the electrolyte membrane and the another separator, the another separator may include flow path grooves linearly extending, and the connecting portions of the first and second grooves may face the flow path grooves of the another separator via the electrolyte membrane and the first and second catalyst layers, and may extend in a direction intersecting the flow path grooves of the another separator.

The wavy portion of at least one of the first and second grooves may include a wavy shape having a constant wavelength and constant amplitude, and extending with a length greater than a length of one period.

The wavy portions of the first and second grooves may have identical wavelength, identical amplitude, and identical phase, and may be adjacent to each other.

DETAILED DESCRIPTION

Figure 1:
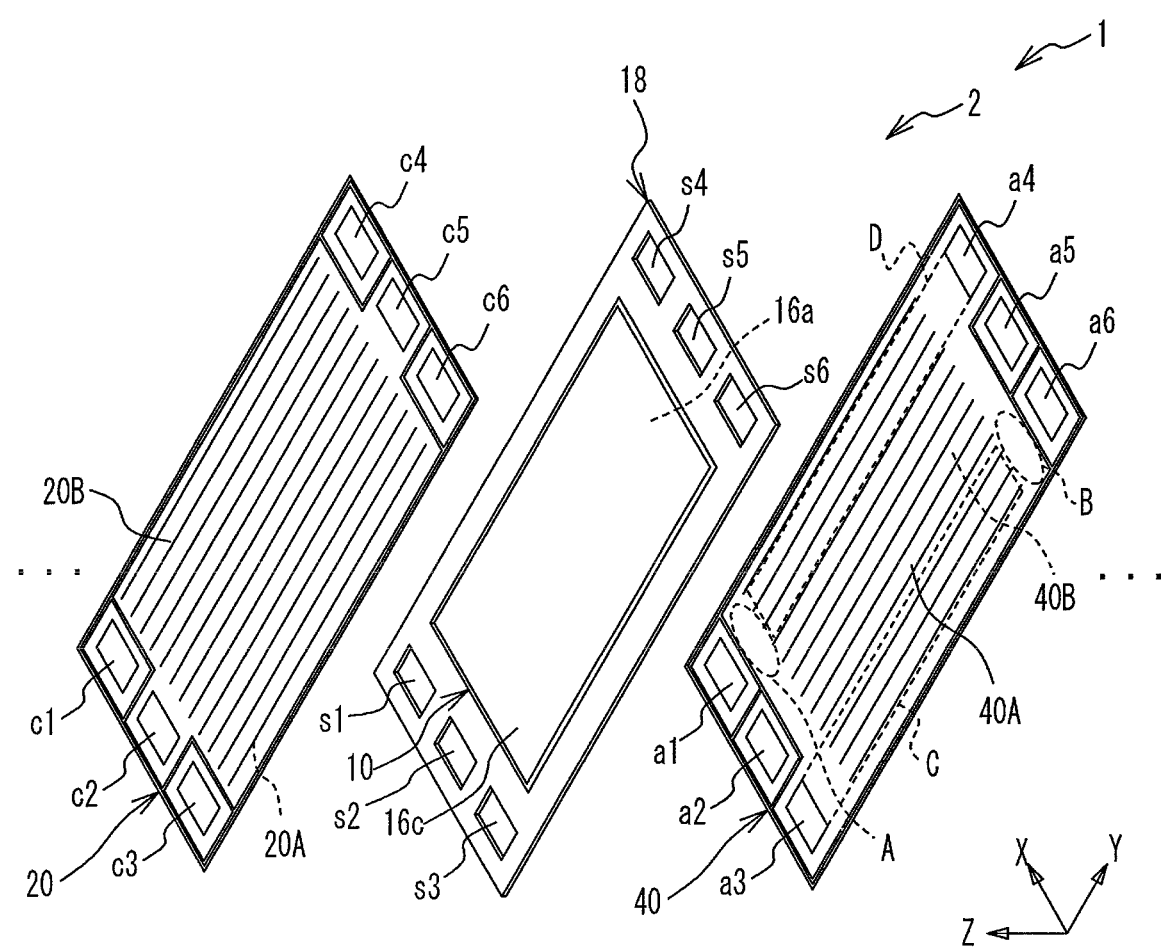
FIG. 1 is an exploded perspective view of a unit cell of a fuel cell.

FIG. 1 is an exploded perspective view of a unit cell 2 of a fuel cell 1. The fuel cell 1 is configured by stacking unit cells 2. FIG. 1 illustrates only one unit cell 2, and omits other unit cells. The unit cell 2 is stacked with other unit cells in the Z direction illustrated in FIG. 1. The unit cell 2 has a substantially rectangular shape. The longitudinal direction and the short direction of the unit cell 2 correspond to the Y direction and the X direction illustrated in FIG. 1, respectively.

The fuel cell 1 is a polymer electrolyte fuel cell that generates electric power with a fuel gas (for example, hydrogen) and an oxidant gas (for example, oxygen) as reactant gases. The unit cell 2 includes: a membrane electrode gas diffusion layer assembly (MEGA) 10; a support frame 18 supporting the MEGA 10; a cathode separator 20 and an anode separator 40 (hereinafter referred to as separators) sandwiching the MEGA 10. The MEGA 10 has a cathode gas diffusion layer 16c and an anode gas diffusion layer 16a (hereinafter referred to as diffusion layers). The support frame 18 has a substantially frame shape, and its inner peripheral side is joined to a peripheral region of the MEGA 10.

Holes c1 to c3 are formed along one of two short sides of the separator 20, and holes c4 to c6 are formed along the other side. Likewise, holes s1 to s3 are formed along one side of two short sides of the support frame 18, and holes s4 to s6 are formed along the other side. Likewise, holes a1 to a3 are formed along one side of two short sides of the separator 40, and holes a4 to a6 are formed along the other side. The holes c1, s1, and a1 communicate with one another to define a cathode inlet manifold. Likewise, the holes c2, s2, and a2 define a coolant inlet manifold. The holes c3, s3, and a3 define an anode outlet manifold. The holes c4, s4, and a4 define an anode inlet manifold. The holes c5, s5, and a5 define a coolant outlet manifold. The holes c6, s6, and a6 define a cathode outlet manifold. In the fuel cell 1 according to the present embodiment, liquid cooling water is used as a coolant.

A surface of the separator 40 facing the MEGA 10 is formed with an anode flow path portion 40A (hereinafter referred to as flow path portion) which communicate the anode inlet manifold with the anode outlet manifold and along which the fuel gas flows. The surface of the separator 20 facing the MEGA 10 is formed with a cathode flow path portion 20A (hereinafter referred to as flow path portion) which communicate the cathode inlet manifold with the cathode outlet manifold and along which the oxidant gas flows. The surface of the separator 40 opposite to the flow path portion 40A and the surface of the separator 20 opposite to the flow path portion 20A are respectively formed with coolant flow path portions 40B and 20B (hereinafter referred to as flow path portions) which communicate the coolant inlet manifold with the coolant outlet manifold and along which the coolant flows. The flow path portions 20A and 20B extend in the longitudinal direction of the separator 20 (Y direction). Likewise, the flow path portions 40A and 40B extend in the longitudinal direction of the separator 40 (Y direction). Each flow path portion is basically provided in a region, facing the MEGA 10, of the separator in the XY plane. The separators 20 and 40 are made of a material having a gas blocking property and electrical conductivity, and are thin plate shaped members formed by pressing stainless steel, metal such as titanium or titanium alloy. FIG. 1 illustrates regions A, B, C, and D on the flow path portion 40A of the separator 40 that are surrounded by dotted lines, as will be described later in detail.

Figure 2:
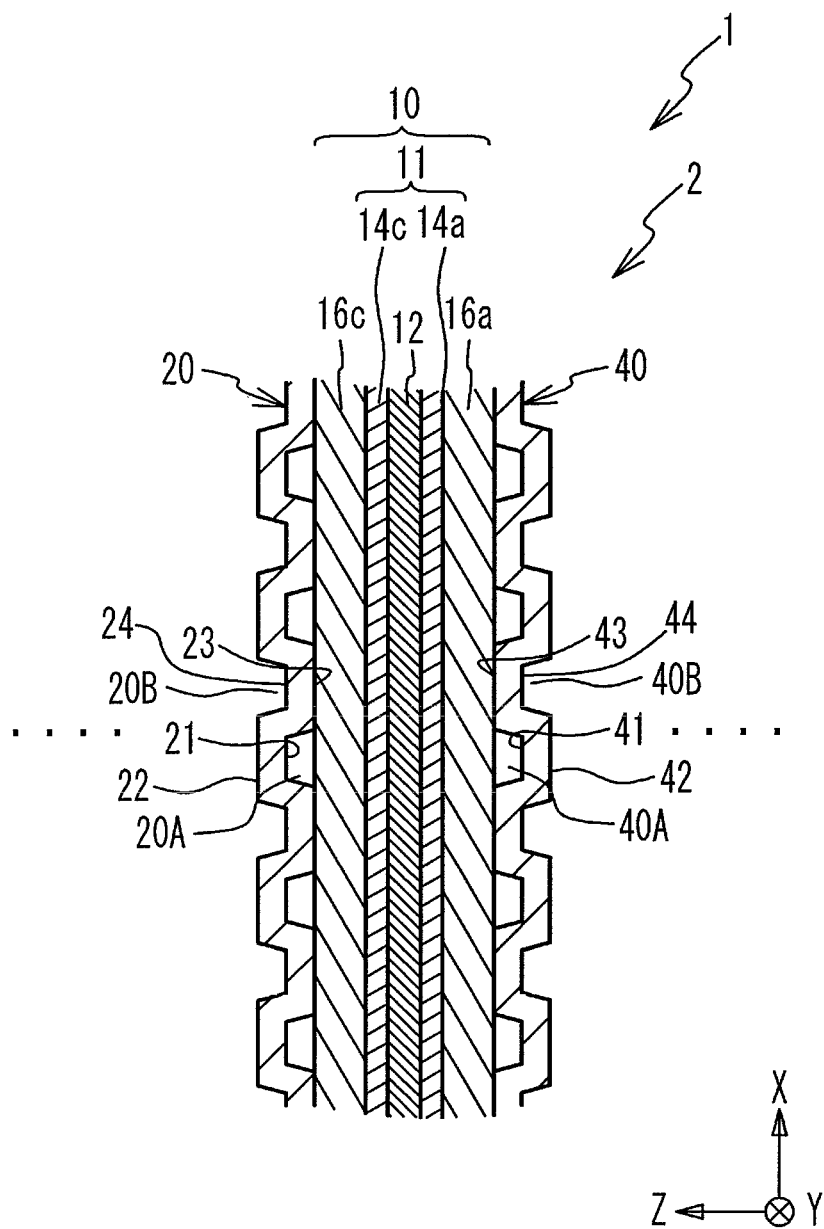
FIG. 2 is a partially cross-sectional view of the fuel cell where the unit cells are stacked.

FIG. 2 is a partially cross-sectional view of the fuel cell 1 where the unit cells 2 are stacked. FIG. 2 illustrates only one unit cell 2, and omits the other unit cells. FIG. 2 illustrates a cross section orthogonal to the Y direction.

The MEGA 10 includes the diffusion layers 16a and 16c, and a membrane electrode assembly (MEA) 11. The MEA 11 includes an electrolyte membrane 12, and an anode catalyst layer 14a and a cathode catalyst layer 14c (hereinafter referred to as catalyst layers) formed on one surface and the other surface of the electrolyte membrane 12, respectively. The electrolyte membrane 12 is a solid polymer thin film, such as a fluorine-based ion exchange membrane, with high proton conductivity in a wet state. The catalyst layers 14a and 14c are made by coating a catalyst ink containing a carbon support carrying platinum (Pt) or the like and an ionomer having proton conductivity on the electrolyte membrane 12. The diffusion layers 16a and 16c are made of a material having gas permeability and conductivity, for example, a porous fiber base material such as carbon fiber or graphite fiber. The diffusion layers 16a and 16c are joined to the catalyst layers 14a and 14c, respectively.

Each of the flow path portions 20A, 20B, 40A, and 40B has a wavy shape in cross section when viewed in the Y direction. Specifically, regarding the flow path portion 20A, a flow path groove 21, recessed away from the diffusion layer 16c, and a rib 23, protruding to and contacting with the diffusion layer 16c, are alternately arranged in the X direction. The cathode gas, flowing along the insides of the flow path grooves 21, is supplied to the catalyst layer 14c of the MEA 11 via the diffusion layer 16c. Further, regarding the flow path portion 20B, a rib 22, protruding opposite to the diffusion layer 16c and contacting with an anode separator of another unit cell (not illustrated) adjacent to the separator 20 in the −Z direction, and a flow path groove 24, receded away from this anode separator, are alternately arranged in the X direction. The coolant flows along the insides of the flow path grooves 24. Herein, the flow path grooves 21 and the ribs 22 are formed integrally on the front and rear surfaces, and the ribs 23 and the flow path grooves 24 are formed integrally on the front and rear surfaces. The flow path grooves 21 and 24 and the ribs 22 and 23 extend in the Y direction.

Likewise, regarding the flow path portion 40A, a flow path groove 41, recessed away from the diffusion layer 16a, and a rib 43, protruding to and contacting with the diffusion layer 16a are alternately arranged in the X direction. The anode gas, flowing along the insides of the flow path grooves 41, is supplied to the catalyst layer 14a of the MEA 11 via the diffusion layer 16a. Further, regarding the flow path portion 40B, a rib 42, protruding opposite to the diffusion layer 16a and contacting with a cathode separator of another unit cell (not illustrated) adjacent to the separator 40 in the +Z direction, and a flow path groove 44, receded away from this cathode separator, are alternately arranged in the X direction. The coolant flows along the insides of the flow path grooves 44. Herein, the flow path grooves 41 and the ribs 42 are formed integrally on the front and rear surfaces, and the ribs 43 and the flow path grooves 44 are formed integrally on the front and rear surfaces. The flow path grooves 41 and 44 and the ribs 42 and 43 extend in the Y direction.

Figure 3:
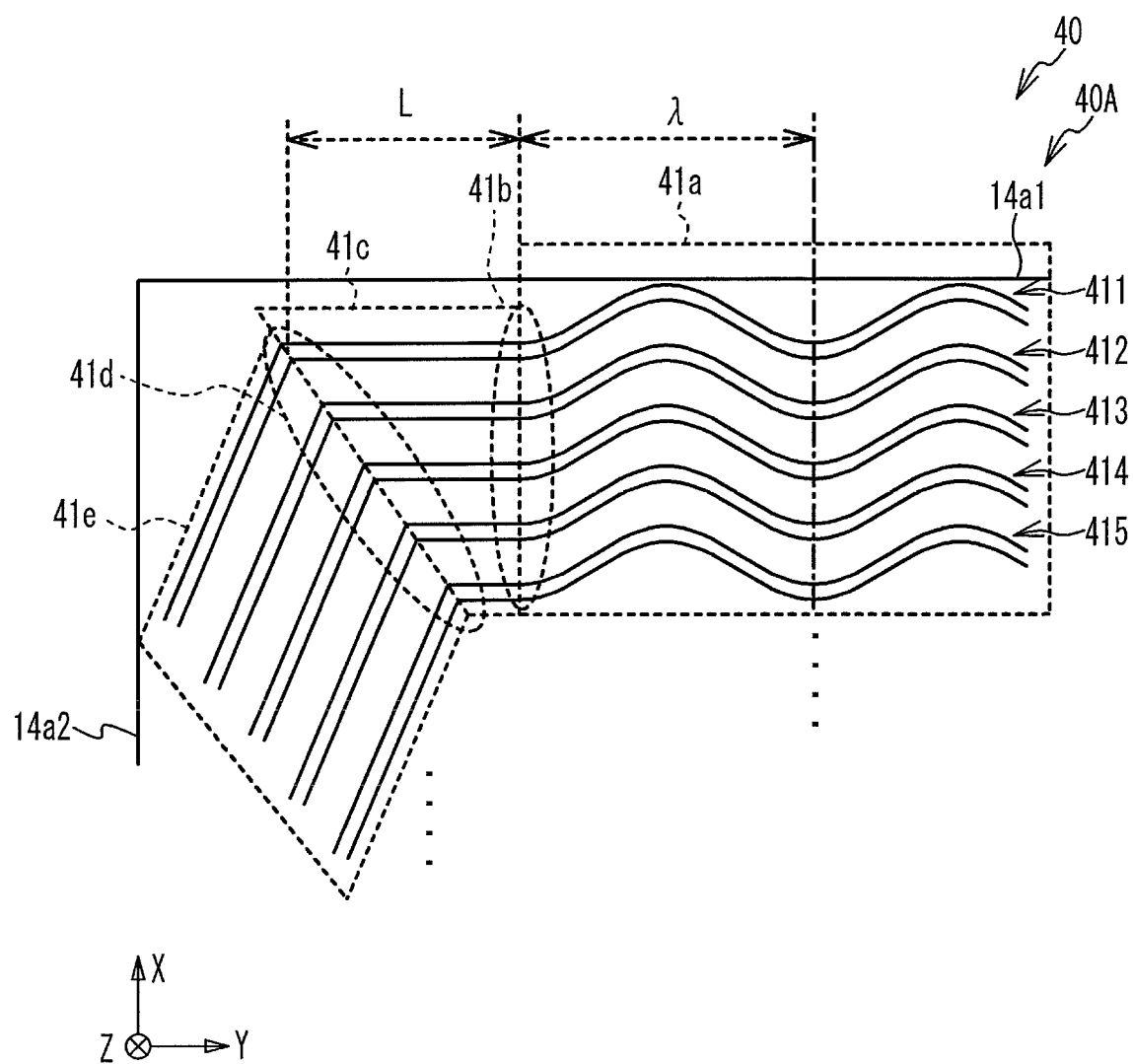
FIG. 3 is an enlarged view illustrating a part of a flow path portion of a separator in the present embodiment.

FIG. 3 is an enlarged view illustrating a part of the flow path portion 40A of the separator 40 in the present embodiment. FIG. 3 illustrates the vicinity of a region A illustrated in FIG. 1. FIG. 3 partially illustrates grooves 411 to 415 as a part of the flow path grooves 41. Each of the grooves 411 to 415 includes a wavy portion 41a, a connecting portion 41c, and a linear portion 41e. These wavy portions 41a wavily extend from the right side of FIG. 3 in the −Y direction. The wavy portions 41a are substantially the same in a pitch interval between the grooves in the X direction, in wavelength, in phase, and in amplitude. The −Y direction corresponds to the first direction. Each wavy portion 41a has a constant wavelength, and a constant amplitude, and a length greater than one period. The connecting portion 41c is located in the −Y direction from the wavy portion 41a and extends therefrom in the same −Y direction, but has a linear shape different from the shape of the wavy portion 41a. These connecting portions 41c extend in substantially the same direction and in substantially parallel to one another. These connecting portions 41c preferably extend completely in the same direction, but for example, they may extend substantially in parallel with an angular difference of ±10 degrees or less or ±5 degrees or less. Additionally, these connecting portions 41c may extend with an angular difference of ±10 degrees or less or ±5 degrees or less with respect to the −Y direction. The linear portion 41e is located away from the wavy portion 41a in the −Y direction and extends from the connecting portion 41c in a direction intersecting the −Y direction, specifically, linearly extends in a direction between the −Y direction and the −X direction. The direction in which the linear portion 41e extends corresponds to the second direction. The linear portion 41e extends from the connecting portion 41c toward the hole a3. The linear portions 41e are also substantially parallel to one another. As will be described later, FIG. 3 illustrates the wavelength λ of the wavy portion 41a and the maximum length L of the connecting portion 41c.

The wavy portions 41a are formed substantially at the center on the XY plane of the flow path portion 40A. The connecting portions 41c and the linear portions 41e are formed near the end portion located away from the center in the −Y direction on the XY plane of the flow path portion 40A. A connection point 41b indicates between the wavy portion 41a and the connecting portion 41c. A connection point 41d indicates between the connecting portion 41c and the linear portion 41e. The connection points 41b are arranged in the X direction. The connection points 41d are arranged in a direction intersecting the X direction. Although illustration of portions of the wavy portions 41a on the +Y direction is omitted in FIG. 3, the wavy portions 41a extend toward the vicinity of the ends, located away from the center in the +Y direction, of the flow path portion 40A. Although illustration is omitted in FIG. 3, the end portion of the linear portions 41e extend toward the hole a3. Additionally, parts where the linear portions 41e are not illustrated may be partially curved before reaching the hole 3a.

Among the flow path grooves 41 formed in the flow path portion 40A, the groove 411 is located farthest from the center in the +X direction. Among the linear portions 41e, the linear portion 41e of the groove 411 is located farthest from the center in the −Y direction. Additionally, FIG. 3 illustrates an edge 14a1 of the catalyst layer 14a located away from the center in the +X direction. FIG. 3 illustrates an edge 14a2 located away from the center in the −Y direction and orthogonal to the edge 14a1. The edge 14a1 is substantially perpendicular to the X direction and extends substantially linearly in the Y direction. The edge 14a2 is substantially perpendicular to the Y direction and extends substantially linearly in the X direction. The edges 14a1 and 14a2 are an example of a first edge and a second edge continuing to the first edge and extending in a direction different from the direction in which the first edge extends. Among the flow path grooves 41, at least a part of the grooves 411 to 415 illustrated in FIG. 3 overlap the catalyst layer 14a in the Z direction.

Although the ribs 43 illustrated in FIG. 2 are represented without numerical references in FIG. 3, the ribs 43 are formed between adjacent grooves. The shapes of the ribs 43 also correspond to those of the grooves 411 to 415. For example, a part of the rib 43 also extends wavily between the wavy portions 41a. Further, a part of the rib 43 also extends linearly between the connecting portions 41c. Likewise, a part of the rib 43 extends linearly between the linear portions 41e. As described above, each of the wavy portions 41a of the grooves 411 to 415 has a constant wavelength and amplitude and extends beyond a length of one period. Therefore, a part of the rib 43 also extends wavily beyond the length of one period, which ensures the flow path grooves 41 and the ribs 43 each of which is partially wavily shaped.

Referring to FIG. 2, a description will be given of one of the main reasons why at least the flow path grooves 41 and the ribs 43 are partially wavy shaped. For example, in a case where all of the flow path grooves 41 and the ribs 43 of the separator 40 and all of the flow path grooves 21 and the ribs 23 of the separator 20 are linear, if the relative position between the separators 20 and 40 is displaced from the desired position in the planar direction, the rib 23 of the separator 20 is positionally displaced from the rib 43 of the separator 40 in the X direction in the state where the MEGA 10 is sandwiched therebetween. Since the MEGA 10 has low rigidity, if the ribs 23 of the separator 20 are positionally displaced from the ribs 43 of the separator 40 in the X direction in a long range (for example, 4 mm or more) in the Y direction, the MEGA 10 might be bent to be locally subjected to strong stress, so that the strength of the MEA 11 might decrease. In contrast, in a case where the flow path grooves 21 and the ribs 23 of the separator 20, facing the wavy portions 41a of the flow path grooves 41 and the wavy portion of the ribs 43 via the MEGA 10, each has a linear shape, or a wavy shape different from a wavy shape of the wavy portion 41a of the flow path grooves 41 in phase, amplitude, wavelength or the like, even if the relative position between the separators 20 and 40 is displaced from the desired position as described above, the MEGA 10 is suppressed from being bent by positionally displacing the ribs 23 of the separator 20 from the ribs 43 of the separator 40 in the X direction in a long range in the Y direction. This suppresses the decrease in strength of the MEA 11. In the present embodiment, the flow path grooves 21 and the ribs 23 of the separator 20, facing the wavy portions 41a of the flow path grooves 41 and the ribs via the MEGA 10, each has a linear shape, but they not limited thereto.

Figure 4A:
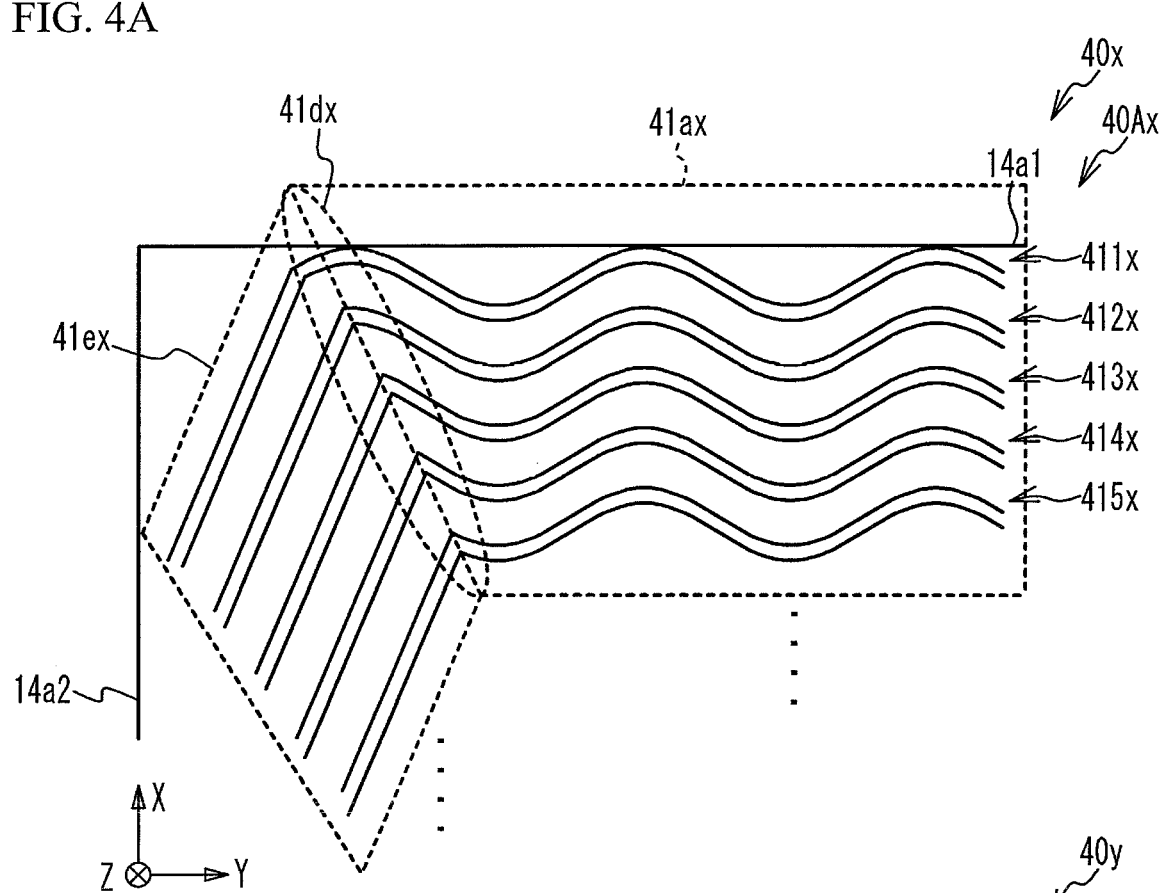
FIG. 4A is an enlarged view illustrating a part of a flow path portion of a separator in a first comparative example.

Next, the present embodiment will be described in comparison with comparative examples. FIG. 4A is an enlarged view illustrating a part of a flow path portion 40Ax of a separator 40x in the first comparative example. FIG. 4A corresponds to FIG. 3. Unlike the flow path portion 40A in the present embodiment, the connecting portions 41c are not respectively provided in the flow path portion 40Ax of the separator 40x, and wavy portions 41ax of grooves 411x to 415x are respectively connected directly to linear portions 41ex. Herein, connection points 41dx between the wavy portions 41ax and the linear portions 41ex are arranged in a direction intersecting the X direction, like the direction in which the connection points 41d are arranged in the present embodiment. Herein, the wavy portions 41ax are substantially the same in phase and wavelength. Therefore, the phase position of the wavy portion 41ax at the connection point 41dx differs for each of the grooves 411x to 415x, and the tangential direction of the wavy portion 41ax at the connection point 41dx also differs for each of the grooves 411x to 415x. Thus, the angle between the tangential direction of the wavy portion 41ax at the connection point 41dx and the extending direction of the linear portion 41ex also differs for each of the grooves 411x to 415x. Accordingly, the pressure loss of the anode gas as well as the flow rate of the anode gas differ for each of the grooves 411x to 415x. For example, the groove 415x at the connection point 41dx continues from the wavy portion 41ax to the linear portion 41ex at an acute angle. However, the groove 411x at the connection point 41dx gently continues from the wavy portion 41ax to the linear portion 41ex, as compared with the groove 415x. The pressure loss of the anode gas might be larger in the groove 415x than in the groove 411x, and the flow rate of the anode gas might be smaller in the groove 415x than in the groove 411x. In this way, the difference in flow rate of the anode gas between the grooves 411x to 415x might increase, and the anode gas might be hardly supplied to a part of the catalyst layer 14a. As a result, the power generation performance might be deteriorated.

On the other hand, in the present embodiment illustrated in FIG. 3, the wavy portion 41a is not directly connected to the linear portion 41e, but via the connecting portion 41c linearly extending. Therefore, the angle between the connecting portion 41c and the linear portion 41e at the connection point 41d is substantially the same for each of the grooves 411 to 415. This suppresses the increase in the difference in pressure loss of the anode gas between the grooves 411 to 415, and suppresses the increase in the difference in flow rate of the anode gas therebetween. This also suppresses the anode gas from being hardly supplied to a part of the catalyst layer 14a. This also suppresses the deterioration of the power generation performance due to deterioration of the catalyst layer 14a caused by hydrogen deficiency.

Further, in the present embodiment, the phase position of the wavy portion 41a at the connection point 41b is substantially the same for each of the grooves 411 to 415. Therefore, the angle between the tangential direction of the wavy portion 41a and the extending direction of the connecting portion 41c at the connection point 41b is substantially the same for each of the grooves 411 to 415. This suppresses the increase in the difference in pressure loss of the anode gas between the grooves 411 to 415, and suppresses the increase in the difference in flow rate of the anode gas therebetween. This also suppresses the deterioration of the power generation performance.

Furthermore, in the present embodiment, the connecting portion 41c extends in the tangential direction of the wavy portion 41a at the connection point 41b. Therefore, the wavy portion 41a smoothly continues to the connecting portion 41c at the connection point 41b, which suppresses the increase in pressure loss of the anode gas. This configuration ensures each flow rate of the anode gas flowing through the grooves 411 to 415, and the anode gas is supplied to the entire catalyst layer 14a.

Figure 4B:
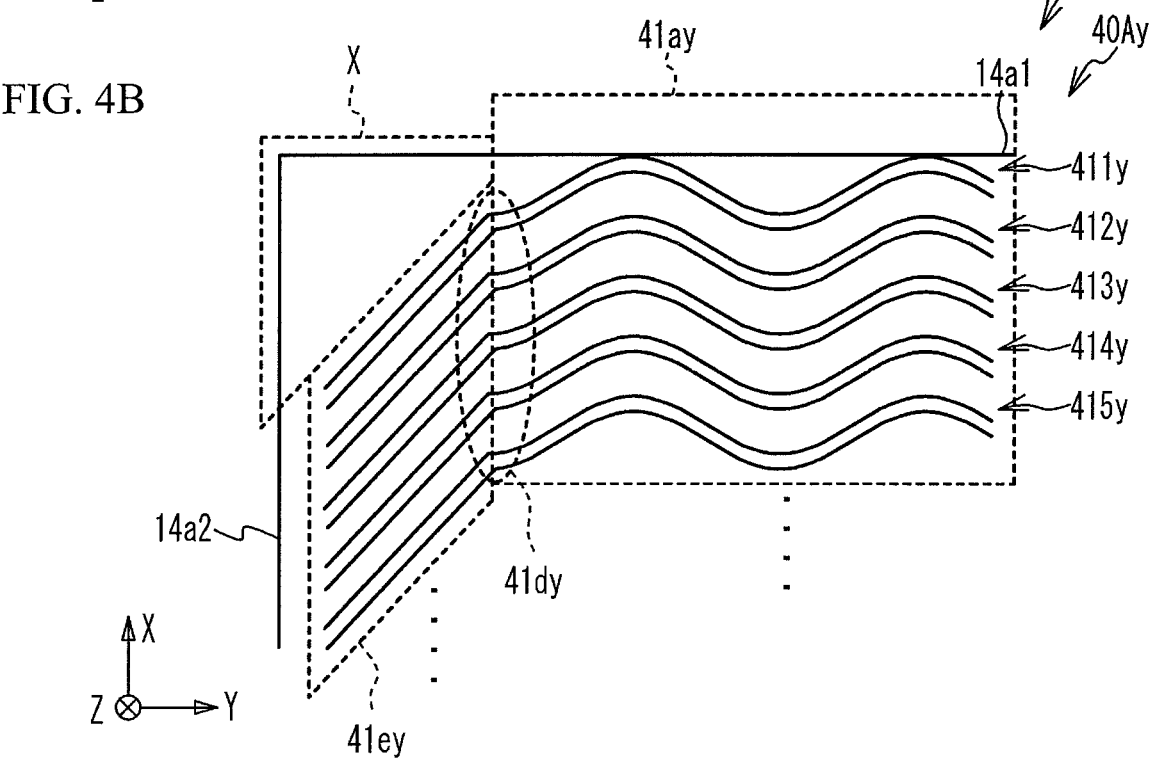
FIG. 4B is an enlarged view illustrating a part of a flow path portion of a separator in a second comparative example.

FIG. 4B is an enlarged view illustrating a part of a flow path portion 40Ay of a separator 40y in a second comparative example. FIG. 4B corresponds to FIG. 3. Unlike the flow path portion 40A in the present embodiment, the angle between the extending direction of a linear portion 41ey and the Y direction is smaller than that between the extending direction of the linear portion 41e and the Y direction in the present embodiment. Connection points 41dy between wavy portions 41ay and the linear portions 41ey are arranged in the X direction. The wavy portions 41ay have substantially the same phase and wavelength. Therefore, the phase position of the wavy portion 41ay at the connection point 41dy is substantially the same for each of grooves 411y to 415y, and the flow rate of the anode gas is also substantially the same for each of the grooves 411y to 415y. However, as illustrated in FIG. 4B, the grooves 411y to 415y not extend to the vicinity of a corner portion X of the catalyst layer 14a between the edge 14a1 and the edge 14a2. Therefore, the anode gas might not be sufficiently supplied to the corner portion X, which might degrade the power generation performance.

On the other hand, in the present embodiment illustrated in FIG. 3, each of the grooves 411 to 415 includes the connecting portion 41c extending from the wavy portion 41a to the edge 14a2 of the catalyst layer 14a, and the connection point 41d of the groove 411 that is the closest to the edge 14a1 is the closest to the edge 14a2. Specifically, the grooves 411 to 415 are arranged in ascending order of the distance between the connection point 41d and the edge 14a2. In other words, the connecting portion 41c of the groove 411 closest to the edge 14a1 among the connecting portions 41c is the longest, under the condition that the connection points 41b of the grooves 411 to 415 are substantially the same in position in the Y direction. In this way, the groove 411 extends to the vicinity of the corner portion of the catalyst layer 14a, and a part of the anode gas flowing through the groove 411 is supplied to the corner portion of the catalyst layer 14a. This suppresses the anode gas from being hardly supplied to a part of the catalyst layer 14a, which suppresses the deterioration of the power generation performance.

In the present embodiment, a length of the connecting portion 41c of the groove 411 is the maximum length L of the connecting portions 41c in the Y direction, but the maximum length L is less than or equal to the wavelength λ of the wavy portion 41a. That is, each connecting portion 41c is shorter than the wavelength λ of the wavy portion 41a in the Y direction. The present embodiment ensures the ratio of the area of the wavy portions 41a to the area of the flow path portion 40A in the XY plane. Such a configuration suppresses the MEGA 10 from being bent over a long range in the Y direction as described above, which suppresses the decrease in strength of the MEA 11.

Next, the region A illustrated in FIG. 1 will be described. The region A is an area where at least the connecting portions 41c are formed. Additionally, FIG. 1 illustrates a region C formed by projecting the hole a3 toward the hole a4 in the +Y direction. The region A is located closer to the hole a3 than the hole a4 and away from the region C in the +X direction. Preferably, the connecting portions 41c are formed in such a region A. The reason is as follows. Although the hole a3 is located at an end of the separator 40 that is located away from the center in the −X direction, the region A is located on the side of the separator 40 away from the center in the +X direction. Accordingly, it is needed to guide the anode gas flowing on the side, of the flow path portion 40A of the separator 40, located away from the center in the +X direction, to the hole a3. The above description does not mean the connecting portions 41c are limited to be formed in the region A in the present embodiment. The connecting portions 41c may be formed outside the region A.

Preferably, grooves including the connecting portions illustrated in FIG. 3 are also formed in a region B. The regions A and B are symmetrical with respect to the center on the XY plane of the flow path portion 40A. Preferably, the shape of the grooves formed in the region B and the shape of the grooves 411 to 415 illustrated in FIG. 3 are symmetrical with respect to the center on the XY plane of the flow path portion 40A. Additionally, FIG. 1 illustrates a region D formed by projecting the hole a4 toward the hole a3 in the −Y direction. Preferably, the region B is located closer to the hole a4 than the hole a3 and away from the region D in the −X direction. This is because it is needed to guide a part of the anode gas, flowing from the hole a4 to the hole a3 via the flow path portion 40A, toward the end of the flow path portion 40A away from the other ends in the −X direction. The above description does not mean the connecting portions 41c are limited to be formed in the region B in the present embodiment. The connecting portions 41c may be formed outside the region B. The holes a3 and a4 are examples of the first and second manifold holes through which the anode gas flows.

The wavy portions 41a of the grooves 411 to 415 have substantially the same wavelength, the same phase, the same amplitude, and the common shape. Here, in general, as for pressing, the shape of a metal plate formed by dies is not always the same as the reversed shape of the die. After the metal plate is deformed by the die, the shape of the metal plate slightly becomes to its original shape before the molding, due to the elasticity of the metal plate. This is called spring back. For this reason, this spring back is taken into consideration in designing the dies. In a case where groove shapes differ from each other, it might be needed to design the dies for the respective groove shapes, and it might take long time for designing the die. In the present embodiment, the grooves have the common shape. It is thus possible to suppress the long time required to design the dies. In the case of forming a precise shape like a separator for a fuel cell, the metal plate is pressed with different dies several times, so that the metal plate is gradually expanded to achieve the final product shape. In a case where the wavy shapes in the final product shape differ from each other, the design of the dies used in pressing is different, so that the time required to design the dies might be further prolonged. On the other hand, the wavy portions 41a of the grooves 411 to 415 have the common shape in the present embodiment. It is thus possible to form the common shape in the dies for pressing, and to suppress the prolongation of the time required to design the dies for producing the separator.

In the present embodiment, as illustrated in FIG. 3, the phase of the wavy portion 41a at the connection point 41b is the same for each of the grooves 411 to 415. In other words, the angle between the wavy portion 41a and the connecting portion 41c at the connection point 41b is the same for each of the grooves 411 to 415. However, even in a case where the angle between the wavy portion 41a and the connecting portion 41c at the connection point 41b differs for each of the grooves 411 to 415, it is possible to suppress the increase in the difference in pressure loss of the anode gas as compared with the first comparative example, as long as the direction in which the connecting portion 41c extends is substantially the same as the −Y direction in which the wavy portion 41a extends, that is, as the above-described first direction. This point will be described below.

Figure 5A:
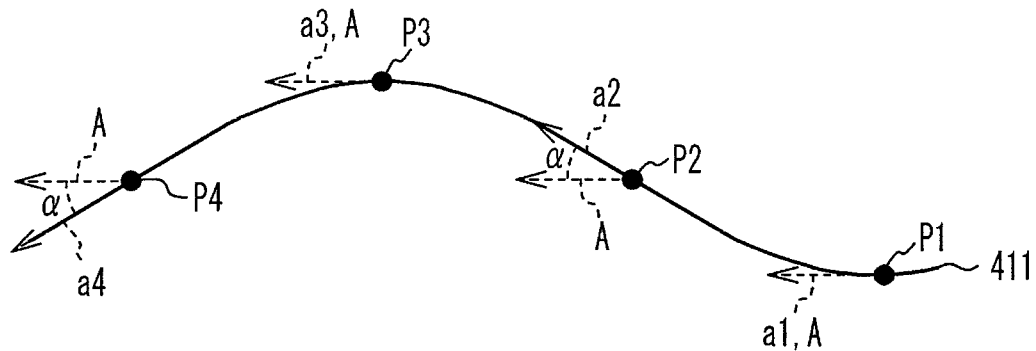
FIG. 5A is an explanatory view of a difference in pressure loss of anode gas in a configuration in which an angle at a connection point between a wavy portion and a connecting portion extending in the same direction differs for each of grooves.
Figure 5A:
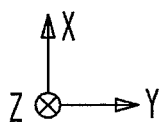

FIG. 5A is an explanatory view of a difference in pressure loss of the anode gas in a configuration in which an angle at a connection point between a wavy portion and a connecting portion extending in the same direction differs for each of grooves. FIG. 5A illustrates the groove 411 having a curved shape, points P1 to P4 on the groove 411, tangential directions a1 to a4 of the groove 411 at the points P1 to P4, and the directions A on the points P1 to P4. The points P1 to P4 indicate the connection point between the wavy portion and the connecting portion. In the present embodiment, the direction A is the direction in which the connecting portion extends, and also the direction in which the wavy portion 41a extends.

For example, in a case where the wavy portion and the connecting portion are connected at the point P1, the anode gas tries to flow to the point P1 along the wavy portion in the tangential direction a1 and tries to flow from the point P1 along the connecting portion in the direction A. Likewise, in a case where the wavy portion and the connecting portion are connected at the point P2, the anode gas tries to flow to the point P2 in the tangential direction a2 and tries to flow from the point P2 in the direction A. In a case where the wavy portion and the connecting portion are connected at the point P3, the anode gas tries to flow to the point P3 in the tangential direction a3 and tries to flow from the point P3 in the direction A. In a case where the wavy portion and the connecting portion are connected at the point P4, the anode gas tries to flow to the point P4 in the tangential direction a4 and tries to flow from the point P4 in the direction A.

Herein, the tangential direction a1 and the direction A at the point P1 are the same. Likewise, the tangential direction a3 and the direction A at the point P3 are the same. Therefore, the angle between the tangential direction a1 and the direction A and the angle between the tangential direction a3 and the direction A are both zero. This angle at each of the points P1 and P3 is the minimum value of a possible angle between the tangential direction of the groove 411 and the direction A, in a case where the wavy portion and the connecting portion are connected at an arbitrary point on the groove 411. Therefore, for example, in a case where the wavy portion and the connecting portion are connected at the point P1, the pressure loss of the anode gas at the point P1 is small, since the angle between the tangential direction a1 and the direction A is zero. Likewise, in a case where the wavy portion and the connecting portion are connected at the point P3, the pressure loss of the anode gas at the point P3 is small, since the angle between the tangential direction a3 and the direction A is zero.

On the other hand, the angle between the tangential direction a2 and the direction A is represented by a, and the angle between the tangential direction a4 and the direction A is represented by the same a. Herein, the angle $\alpha$ at each of the points P2 and P4 is the maximum value of a possible angle between the tangential direction of the groove 411 and the direction A, in a case where the wavy portion and the connecting portion are connected at an arbitrary point on the groove 411. Therefore, in a case where the wavy portion and the connecting portion are connected at the point P2, the pressure loss of the anode gas at the point P2 is large, since the angle between the tangential direction a2 and the direction A is the maximum $\alpha$. Likewise, in a case where the wavy portion and the connecting portion are connected at the point P4, the pressure loss of the anode gas at the point P4 is large, since the angle between the tangential direction a4 at the point P4 and the direction A is the maximum $\alpha$. As described above, in a case of providing a groove, in which the wavy portion and the connecting portion are connected at the point P1 or P3, and a groove, in which the wavy portion and the connecting portion are connected at the point P2 or P4, the difference in pressure loss of the anode gas between the two grooves is the largest. The difference between the angle zero at the point P1 or P3 and the angle $\alpha$ at the point P2 or P4 is $\alpha$. This difference $\alpha$ correlates with the magnitude of the difference in pressure loss of the anode gas between the two grooves.

Figure 5B:
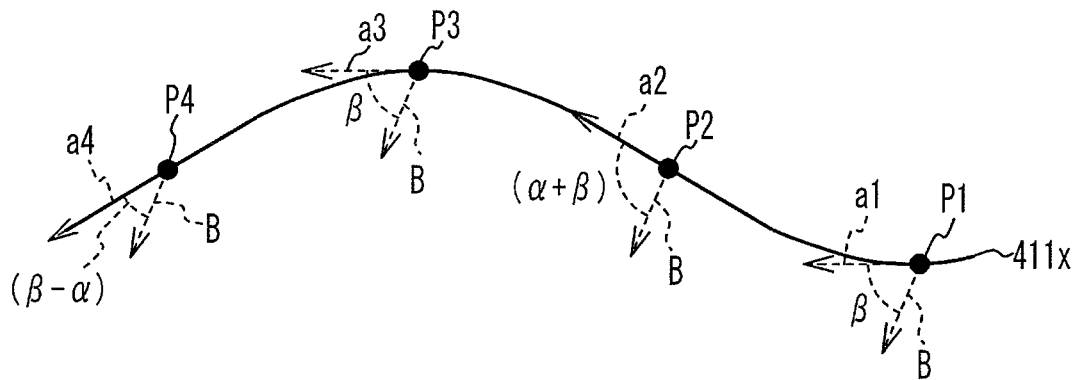
FIG. 5B is an explanatory view of the difference in pressure loss of the anode gas in the first comparative example.
Figure 5B:
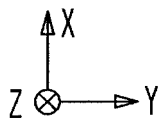

FIG. 5B is an explanatory view of the difference in pressure loss of the anode gas in the first comparative example. Like FIG. 5A, FIG. 5B illustrates schematically the groove 411x, the points P1 to P4, the tangential directions a1 to a4, directions B at the points P1 to P4. Note that the groove 411 illustrated in FIG. 5A and the groove 411x illustrated in FIG. 5B have the same shape, but the different numerical references are given for convenience. The direction B is the direction in which the linear portion 41ex in the first comparative example extends, that is, the above-described second direction. The direction B greatly intersects the direction in which the groove 411x extends. An angle between the direction B and the −Y direction in which the groove 411x extends is $\beta$. $\beta$ is greater than $\alpha$.

For example, in a case where the wavy portion 41ax and the linear portion 41ex are connected at the point P1, the anode gas tries to flow to the point P1 along the wavy portion 41ax in the tangential direction a1 and tries to flow from the point P1 along the linear portion 41ex in the direction B. Likewise, in a case where the wavy portion 41ax and the linear portion 41ex are connected at the point P2, the anode gas tries to flow to the point P2 in the tangential direction a2 and tries to flow from the point P2 in the direction B. In a case where the wavy portion 41a and the linear portion 41ex are connected at the point P3, the anode gas tries to flow to the point P3 in the tangential direction a3 and tries to flow from the point P3 in the direction B. In a case where the wavy portion 41a and the linear portion 41ex are connected at the point P4, the anode gas tries to flow to the point P4 in the tangential direction a4 and tries to flow from the point P4 in the direction B.

Herein, the angle between the tangential direction a1 and the direction B at the point P1 and the angle between the tangential direction a3 and the direction B at the point P3 are both $\beta$. The angle between the tangential direction a2 and the direction B at the point P2 is $(\alpha+\beta)$. Herein, the angle $(\alpha+\beta)$ at the point P2 is the maximum value of a possible angle between the tangential direction of the groove 411x and the direction B, in a case where the wavy portion 41a and the linear portion 41ex are connected at an arbitrary point on the groove 411x. Therefore, the pressure loss of the anode gas at the point P2 is large. The angle between the tangential direction a4 and the direction B at the point P4 is $(\beta-\alpha)$. Herein, the angle $(\beta-\alpha)$ at the point P4 is the minimum value of a possible angle between the tangential direction of the groove 411x and the direction B, in a case where the wavy portion 41a and the linear portion 41ex are connected at an arbitrary point on the groove 411x. Therefore, the pressure loss of the anode gas at the point P4 is small. Herein, in a case of providing a groove, in which the wavy portion 41a and the linear portion 41ex are connected at the point P2, and a groove, in which the wavy portion 41a and the linear portion 41ex are connected at the point P4, the difference in pressure loss of the anode gas between the two grooves is the largest. The difference between the angle $(\alpha+\beta)$ at the point P2 and the angle $(\beta-\alpha)$ at the point P4 is $2\alpha$, and this difference $2\alpha$ correlates with the magnitude of the difference in pressure loss of the anode gas between the two grooves.

The difference $\alpha$ in the configuration described with reference to FIG. 5A is smaller than the difference $2\alpha$ in the first comparative example. This means that the difference in pressure loss of the anode gas between the grooves in the above configuration is smaller than that in the comparative example, and that the increase in the difference in flow rate of the anode gas between the grooves is also suppressed in the above configuration. Therefore, the angle between the wavy portion 41a and the connecting portion 41c at the connection point 41b is the same for each of the grooves 411 to 415 in the present embodiment, but it is not limited to this.

The above describes the case where $\beta$ is greater than $\alpha$, but it is not limited to this. In a case where $\beta$ is smaller than $\alpha$, the minimum value of the angle at the connection point is zero unlike the above description, but the maximum value is $(\alpha+\beta)$ like the above description. Therefore, the maximum value of the possible angle difference is $(\alpha+\beta)$. The maximum value of the angle difference is $\alpha$, which is smaller than $(\alpha+\beta)$, in the case where the direction A of the connecting portion is the above-described first direction. It is therefore possible to suppress the increase in difference in pressure loss correlating with an angle difference. Further, the above describes the case where the direction A of the connecting portion is the first direction, but it is not limited thereto. Even in a case where the direction of the connecting portion is between the first direction and the second direction, the maximum value of a possible angle is small as compared with the case where the wavy portion is connected with the linear portion extending in the second direction. It is therefore possible to suppress the increase in the difference in pressure loss correlating with the angle difference.

Next, variations will be described. In the following variations, the same reference numerals are given to the same components as those of the above-described embodiment, and duplicated explanations are omitted.

Figure 6:
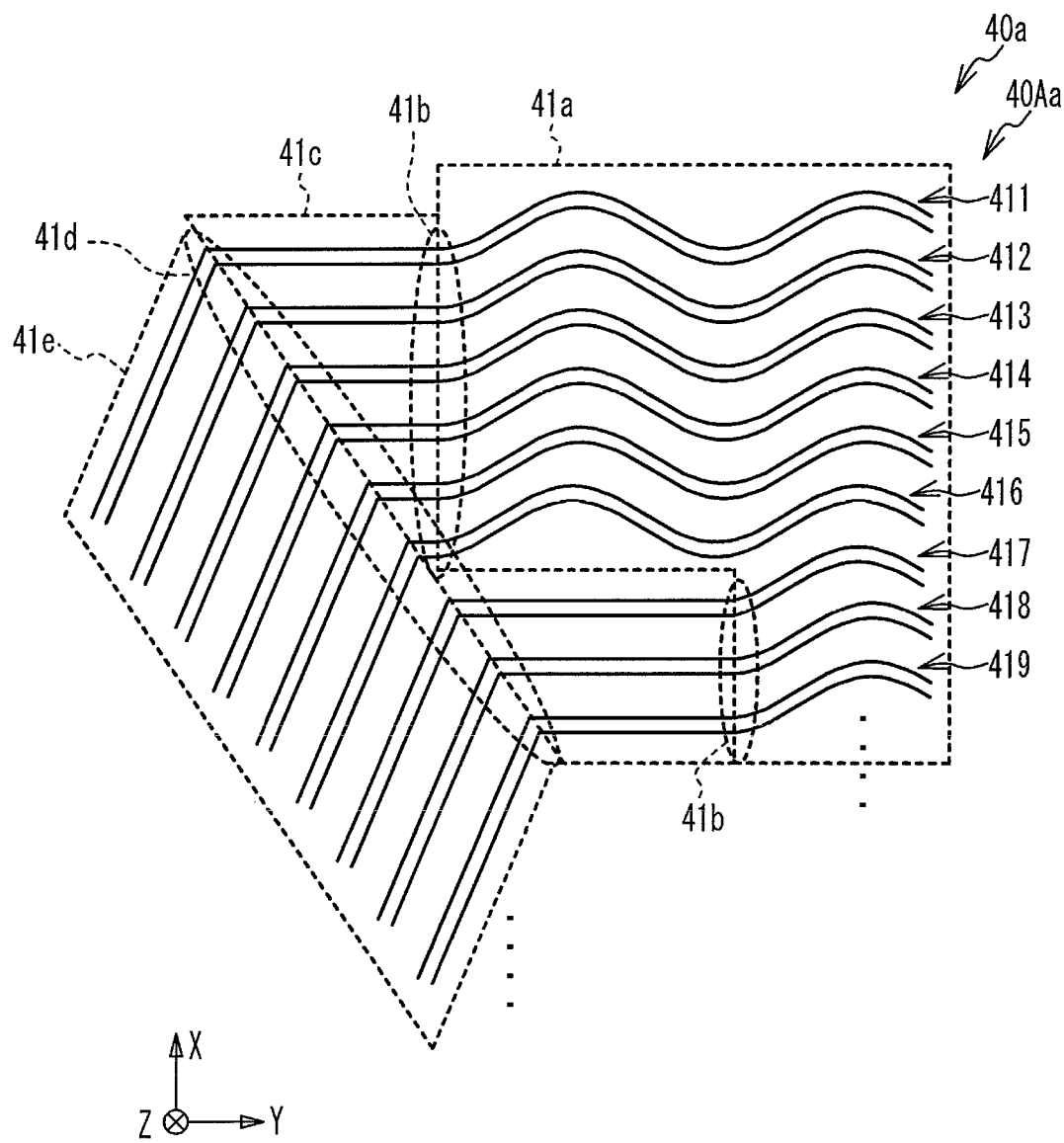
FIG. 6 is an enlarged view illustrating a part of a flow path portion of a separator in a first variation.

FIG. 6 is an enlarged view illustrating a part of a flow path portion 40Aa of a separator 40a in a first variation. FIG. 6 corresponds to FIG. 3. The flow path portion 40Aa is formed with grooves 416 to 419 in addition to the above-described grooves 411 to 415. Like each of the grooves 411 to 415, each of the grooves 416 to 419 also includes the wavy portion 41a, the connecting portion 41c, and the linear portion 41e. The wavy portion 41a of the groove 416 is adjacent to the wavy portion 41a of the groove 415 in the −X direction, and the connecting portion 41c of the groove 416 is shorter than the connecting portion 41c of the groove 415. The connecting portion 41c of the groove 417 is adjacent to the wavy portion 41a of the groove 416 in the −X direction, and the connecting portions 41c of the grooves 417 to 419 are arranged in the X direction. The connection points 41d of the grooves 411 to 419 are arranged to intersect the X direction. Regarding the grooves 417 to 419, the angle between the connecting portion 41c and the linear portion 41e at the connection point 41d is also set to be substantially the same. The angle between the connecting portion 41c and the linear portion 41e at the connection point 41d in each of the grooves 417 to 419 is substantially the same as the angle between the connecting portion 41c and the linear portion 41e at the connection point 41d in each of the grooves 411 to 416. Like the above-described embodiment, each connecting portion 41c of the grooves 411 to 419 is connected to the wavy portion 41a at the connection point 41b in the tangential direction of the wavy portion 41a. Also in the first variation, this suppresses the increase in the difference in pressure loss of the anode gas between the grooves 411 to 419, and suppresses the deterioration of the power generation performance.

Figure 7:
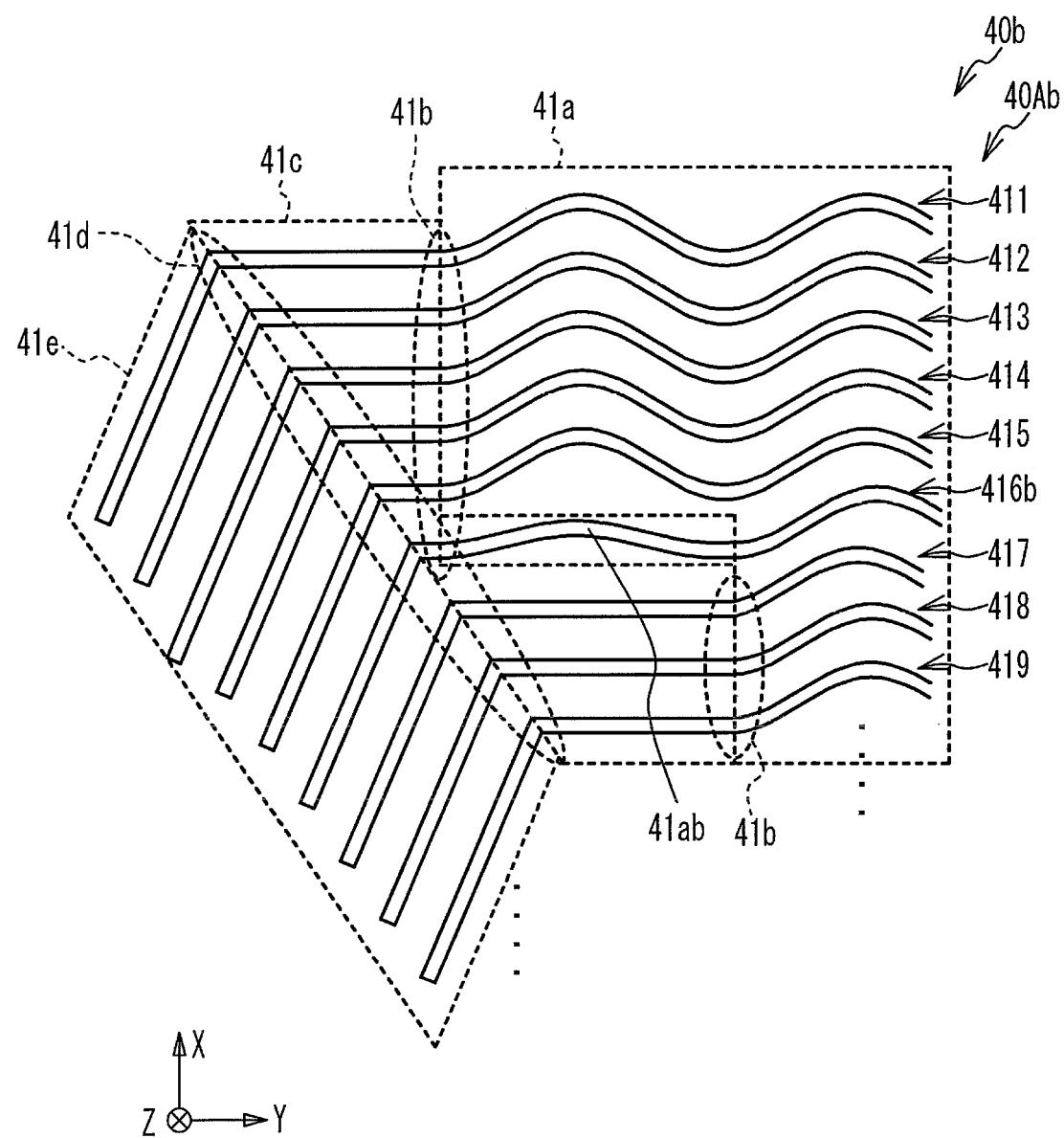
FIG. 7 is an enlarged view illustrating a part of a flow path portion of a separator in a second variation.

FIG. 7 is an enlarged view illustrating a part of a flow path portion 40Ab of a separator 40b in a second variation. A groove 416b includes the wavy portion 41a and a wavy portion 41ab that extends in the −Y direction from the wavy portion 41a and has an amplitude smaller than that of the wavy portion 41a. The wavy portion 41ab of the groove 416b is adjacent to the wavy portion 41a of the groove 415 in the +X direction, and is adjacent to the linear connecting portion 41c of the groove 417 in the −X direction. For example, in a case where the amplitude of the wavy portion 41ab of the groove 416b is the same as that of the wavy portion 41a, an interval in the X direction between the wavy portion 41ab and the connecting portion 41c, having a linear shape of the groove 417 and adjacent to the wavy portion 41ab in the −X direction, partially increases. In this case, the anode gas might be hardly supplied to such a part where the interval between the adjacent grooves partially increases, which might degrade the power generating performance. On the other hand, in the second variation, since the amplitude of the wavy portion 41ab is smaller than that of the wavy portion 41a of the groove 415 adjacent to the wavy portion 41ab in the +X direction. This suppresses the increase in the interval between the wavy portions 41ab and 41a in the X direction. This also suppresses the anode gas from being hardly supplied to a part of the catalyst layer 14a, which suppresses the deterioration of the power generation performance.

In the second variation, when the connecting portion 41c of the groove 417 is interpreted to have a wavy shape with zero amplitude, the amplitude gradually changes in the order of the connecting portion 41c of the groove 417, the wavy portion 41ab of the groove 416, and the wavy portion 41a of the groove 415 that are arranged in the X direction. It is therefore possible to suppress an increase in the elongation percentage of the base material in this region, and to suppress a decrease in the yield rate. It is also possible to reduce the residual stress in pressing this region. Accordingly, it is possible to reduce the possibility of a warp in the separator 40b.

In this variation, the grooves 416b and 417 are examples of the first and second grooves, respectively. The groove 415 is an example of a third groove. The groove 416b is arranged between the groove 415 and the groove 417.

Figure 8A:
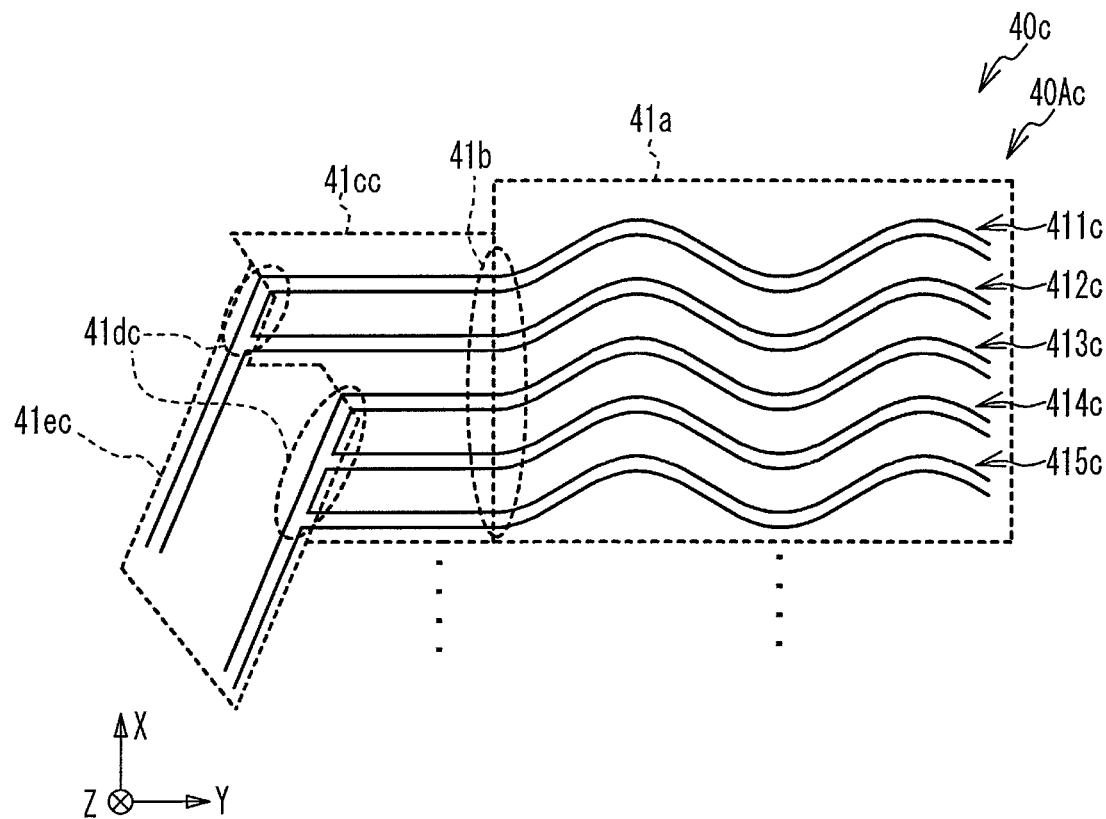
FIG. 8A is an enlarged view illustrating a part of a flow path portion of a separator in a third variation.

FIG. 8A is an enlarged view illustrating a part of a flow path portion 40Ac of a separator 40c in a third variation. FIG. 8A corresponds to FIG. 3. In the flow path portion 40Ac, grooves 411c and 412c share a linear portion 41ec. Likewise, grooves 413c to 415c share the linear portion 41ec. Specifically, a connecting portion 41cc of the groove 412c is connected to a part of the linear portion 41ec of the groove 411c. Likewise, connecting portions 41cc of the grooves 414c and 415c are connected to a part of the linear portion 41c of the groove 413c. Even in such a configuration, since the connecting portions 41cc linearly extend in the same direction and the linear portions 41ec linearly extend in the direction different from the direction of the connecting portions 41cc, the angle between the connecting portion 41cc and the linear portion 41ec is substantially the same for each of the grooves 411c to 415c. In each of the grooves 411c to 415c, the connecting portion 41cc is connected to the wavy portion 41a at the connection point 41b in the tangential direction of the wavy portion 41a. This suppresses the increase in the difference in pressure loss of the anode gas between the grooves 411c and 412c, and also suppresses the increase in the difference in pressure loss of the anode gas between the grooves 413c to 415c, which suppresses the deterioration of the power generation performance. Additionally, the two grooves 411c and 412c join each other, and the three grooves 413c to 415c join one another. It is thus desirable to suppress the increase in the difference between the pressure loss of the anode gas in each of the grooves 411c and 412c and the pressure loss of the anode gas in each of the grooves 413c to 415c. For example, a groove cross-sectional area of the linear portion 41ec of the grooves 413c to 415c may be made to be larger than a groove cross-sectional area of the linear portion 41ec of the grooves 411c and 412c, which may suppress the increase in the difference in pressure loss.

Further, the connecting portion 41cc of the groove 412c is longer than the connecting portion 41cc of the groove 411c. The connecting portion 41cc of the groove 414c is longer than the connecting portion 41cc of the groove 413c. The connecting portion 41cc of the groove 415c is longer than the connecting portion 41cc of the groove 414c. Furthermore, connection points 41dc of the grooves 411c and 412c are arranged in such a direction that the linear portion 41ec shared by the grooves 411c and 412c extends. Likewise, the connection points 41dc of the grooves 413c to 415c are arranged in such a direction that the linear portion 41ec shared by the grooves 413c to 415c extends. Moreover, the connection point 41*dc* of each of the grooves 411*c* and 412*c* and the connection point 41*dc* of each of the grooves 413*c* to 415*c* are not located on the same straight line, unlike the above-described embodiment and the like.

The interval between the adjacent linear portions 41*ec* is wider than the interval between the adjacent connecting portions 41*cc*, and is wider than the interval between the adjacent wavy portions 41*a*, but is not limited thereto. For example, the interval between the adjacent linear portions 41*ec* may be smaller than the interval between the adjacent connecting portions 41*cc*, or the interval between the adjacent wavy portions 41*a*.

Figure 8B:
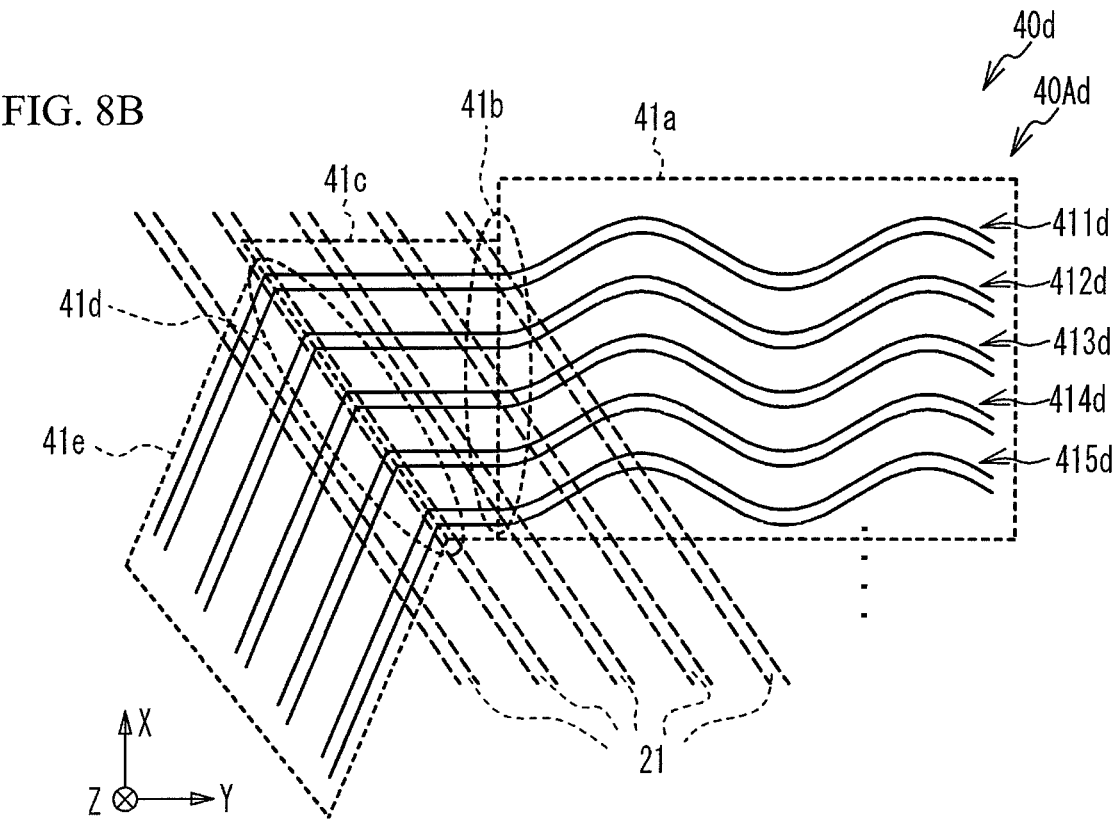
FIG. 8B is an enlarged view illustrating a part of a flow path portion of a separator in a fourth variation.

FIG. 8B is an enlarged view illustrating a part of a flow path portion 40Ad of a separator 40*d* in a fourth variation. Grooves 411*d* to 415*d* in the fourth variation have substantially the same shape as the grooves 411 to 415 in the above-described embodiment, and are formed in the region A. Further; in FIG. 8B, the linearly-extending flow path grooves 21 of the separator 20 are illustrated by dotted lines. The connecting portions 41*c* of the grooves 411*d* to 415*d* face the flow path grooves 21 via the MEGA 10 and extend in the direction intersecting the flow path groove 21. That is, the connecting portion 41*c* is not parallel to the flow path groove 21. This suppresses the MEGA 10 from being bent over a long range in the Y direction, thereby suppressing the decrease in the strength of the MEA 11. Since the linear portion 41*e* also faces the flow path groove 21 via the MEGA 10 and extends in the direction intersecting the flow path groove 21, the decrease in the strength of the MEA 11 is suppressed. The separator 20 is disposed opposite to the electrolyte membrane 12 with respect to the catalyst layer 14*c*, and is an example of another separator different from the separator 40.

In the case where unit cells are stacked such that the grooves 411*d* to 415*d* of the anode flow path portion 40Ad intersect the cathode flow path groove 21 in the fourth variation illustrated in FIG. 8B, the cooling water flows between the adjacent unit cells, specifically, between the flow path portion 40B, formed on the rear surface of the flow path portion 40Ad, and the flow path portion 20B, formed on the rear surface of the cathode flow path portion 20A. Therefore, in accordance with the flow path portions 40B and 20B, the cooling water meanders in the Z direction and flows along the respective flow path portions in the direction of the XY plane. The flow path through which the coolant flows meanders in the Z direction in such a case, the pressure loss of the cooling water may increase. However, by increasing the groove width of the cooling water, it is possible to suppress the increase in the pressure loss of the cooling water. That is, in the fourth variation, the interval between the adjacent cathode flow path grooves 21, partially intersecting the grooves 411*d* to 415*d* of the anode flow path portion 40Ad, may be set to be larger than the interval between the adjacent cathode flow path grooves 21, partially not intersecting the grooves 411*d* to 415*d* of the anode flow path portion 40Ad. Further, the interval between the adjacent grooves 411*d* to 415*d* of the anode flow path portion 40Ad, partially intersecting the cathode flow path grooves 21, may be set larger than the interval between the adjacent grooves 411*d* to 415*d* of the anode flow path portion 40Ad, partially not intersecting the cathode flow path grooves 21.

Figure 9:
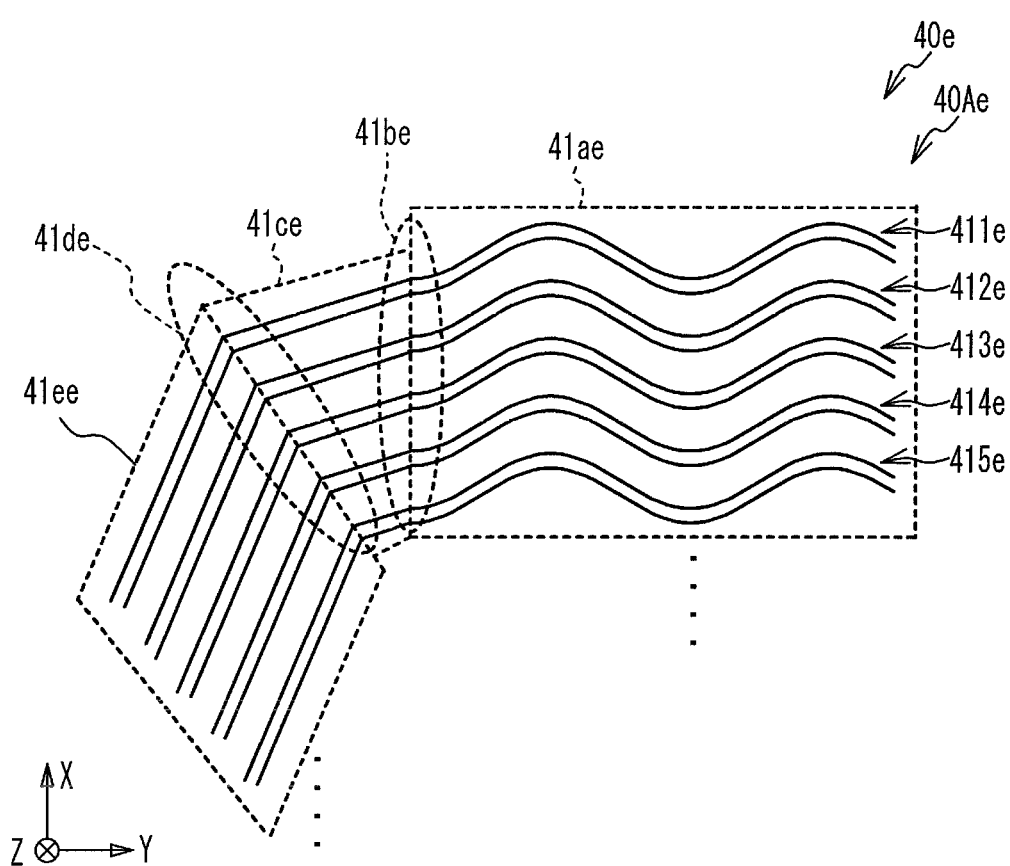
FIG. 9 is an enlarged view illustrating a part of a flow path portion of a separator in a fifth variation.

FIG. 9 is an enlarged view illustrating a part of a flow path portion 40Ae of a separator 40*e* in a fifth variation. In the flow path portion 40Ae, unlike the direction in which the wavy portion 41*ae* extends, the connecting portion 41*ce* extends from a wavy portion 41*ae* to a linear portion 41*ee* in the direction between the −Y direction and the direction in which the linear portion 41*ee* extends. Further, the connecting portion 41*ce* extends in the tangential direction of the wavy portion 41*ae* at a connection point 41*be* between the wavy portion 41*ae* and the connecting portion 41*ce*. Even in such a configuration, the angle between the connecting portion 41*ce* and the linear portion 41*ee* at a connection point 41*de* is substantially the same for each of grooves 411*e* to 415*e*. This suppresses the increase in the difference in pressure loss of the anode gas between the grooves 411*e* to 415*e*, and suppresses the deterioration of the power generation performance. Additionally, the phase position of the wavy portion 41*ae* at the connection point 41*be* is substantially the same for each of the grooves 411*e* to 415*e*, which also suppresses the deterioration of the power generation performance. Each of the interval between the adjacent linear portions 41*ee* and the interval between adjacent connecting portions 41*ce* is smaller than the interval between adjacent wavy portions 41*ae*, but they are not limited thereto.

In the above-described embodiments and variations, the grooves are substantially the same in wavelength and phase, but they are not limited thereto. This is because, as long as the angle between the linear portion and the connecting portion is substantially the same for each of the grooves, the increase in the difference in flow rate of the reactant gas between the grooves is suppressed, and the reactant gas is suppressed from being hardly supplied to a part of the catalytic layer. Further, in the above-described embodiment and the variations, the grooves are formed at substantially the same pitch intervals, but they are not limited thereto.

The flow path grooves in the present embodiment and variations described above may be applied to the cathode separator.

Although the separators 40 to 40*e* are adopted in the water-cooled fuel cell 1 using liquid as the coolant, they are not limited thereto, and may be adopted in an air-cooled fuel cell using air as the coolant.

The wavy groove described above may have a sine wave shape, or a wavy shape with a straight line and an arc.

The wavy portion and the connecting portion may be connected via an arcuate portion having an arcuate shape. In a case where the connecting portion is connected to the wavy portion at the connection point therebetween with a bending angle and is not connected to the wavy portion in the tangential direction thereof, the connection between the wavy portion and the connecting portion via the arcuate portion suppresses the increase in the pressure loss. The arc of the arcuate portion provided in each groove may be the same size or a different size. In a case where the arc have the same size, it is possible to uniform the pressure loss at the arcuate portion, thereby further suppressing the increase in the difference in pressure loss between the grooves. Likewise, the connecting portion and the linear portion may be connected via an arcuate portion. The connecting portion is not limited to a complete linear shape over the entire extended area, and may be curved, for example, in the vicinity of the connection point between the connecting portion and the wavy portion or the connection point between the connecting portion and the linear portion.

Although some embodiments of the present disclosure have been described in detail, the present disclosure is not limited to the specific embodiments but may be varied or changed within the scope of the present disclosure as claimed.

What is claimed is:

1. A fuel cell comprising:
   an electrolyte membrane;

first and second catalyst layers respectively formed on first and second surfaces of the electrolyte membrane; and
a separator, the first catalyst layer being arranged between the separator and the electrolyte membrane,
wherein
the separator includes a plurality of grooves through which reactant gas flows between the first catalyst layer and the separator, wherein the plurality of grooves is greater than four grooves;
each of the plurality of grooves includes:
a wavy portion wavily extending in a first direction;
a linear portion linearly extending in a second direction intersecting the first direction, and located away from the wavy portion in the first direction; and
a connecting portion connecting the wavy portion and the linear portion,
the connecting portions of each of the plurality of grooves respectively include first and second parts,
the first and second parts linearly extend from the wavy portion to the linear portion in respective directions that are substantially identical to the first direction or are between the first and second directions, and
a maximum length of a longest one of the connecting portions of the plurality of grooves in the first direction is less than or equal to a wavelength of the wavy portions of each of the plurality of grooves.

2. The fuel cell of claim 1, wherein an angle between the first part and the wavy portion of a first one of the grooves, at a connection point between the connecting portion of the first one of the grooves and the wavy portion of the first one of the grooves, is identical to an angle between the second part and the wavy portion of a second one of the grooves, at a connection point between the connecting portion of the second one of the grooves and the wavy portion of the second one of the grooves.

3. The fuel cell of claim 1, wherein the connecting portion of a first one of the grooves extends in a tangential direction of the wavy portion of the first one of the grooves at a connection point between the connecting portion of the first one of the grooves and the wavy portion of the first one of the grooves.

4. The fuel cell of claim 1, wherein
a second one of the grooves is adjacent to a first one of the grooves,
the separator includes a third one of the grooves adjacent to the first one of the grooves,
the first one of the grooves is arranged between the third one of the grooves and the second one of the grooves,
the third one of the grooves includes a wavy portion wavily extending in the first direction,
the wavy portion of the third one of the grooves, the wavy portion of the first one of the grooves, and the connecting portion of the second one of the grooves are arranged in a direction orthogonal to the first direction, and
an amplitude of the wavy portion of the first one of the grooves is smaller than that of the wavy portion of the third one of the grooves.

5. The fuel cell of claim 1, wherein the linear portion of a first one of the grooves and the linear portion of a second one of the grooves are commonly used.

6. The fuel cell of claim 1, wherein
the first catalyst layer includes an edge extending along the first direction, and
the first part of the connecting portion of a first one of the grooves extends along the edge.

7. The fuel cell of claim 1, wherein
the first catalyst layer includes:
a first edge extending along the first direction; and
a second edge extending continuously from the first edge in a direction different from a direction in which the first edge extends,
the connecting portion of a first one of the grooves is located between the first edge of the first catalyst layer and the connecting portion of a second one of the grooves,
the linear portion of the first one of the grooves is located between the second edge of the first catalyst layer and the linear portion of the second one of the grooves, and
a connection point between the linear portion of the first one of the grooves and the connecting portion of the first one of the grooves is close to the second edge, as compared with a connection point between the linear portion of the second one of the grooves and the connecting portion of the second one of the grooves.

8. The fuel cell of claim 1, wherein
the separator includes first and second manifold holes through which the reactant gas flows,
the connecting portions of first and second ones of the grooves are close to the first manifold hole, as compared with the second manifold hole, and
the connecting portions of the first and second grooves are located outside a region that is formed by projecting the first manifold hole toward the second manifold hole in a direction parallel to the first direction.

9. The fuel cell of claim 1, further comprising another separator different from the separator,
wherein
the second catalyst layer is arranged between the electrolyte membrane and the another separator,
the another separator includes flow path grooves linearly extending, and
the connecting portions of first and second ones of the grooves face the flow path grooves of the another separator via the electrolyte membrane and the first and second catalyst layers, and extend in a direction intersecting the flow path grooves of the another separator.

10. The fuel cell of claim 1, wherein the wavy portion of at least one of the plurality of grooves includes a wavy shape having a constant wavelength and constant amplitude, and extending with a length greater than a length of one period.

11. The fuel cell of claim 1, wherein the wavy portions of at least two of the plurality of grooves have identical wavelength, identical amplitude, and identical phase, and are adjacent to each other.

* * * * *